(12) United States Patent
Sjerps

(10) Patent No.: US 7,862,749 B2
(45) Date of Patent: Jan. 4, 2011

(54) FLAME RETARDANT POLYURETHANES AND ADDITIVES THEREFOR

(75) Inventor: Rinus Sjerps, Blanden (BE)

(73) Assignee: Albemarle Corporation, Richmond, VA (US)

( * ) Notice: Subject to any disclaimer, the term of this patent is extended or adjusted under 35 U.S.C. 154(b) by 309 days.

(21) Appl. No.: 11/569,210

(22) PCT Filed: May 28, 2004

(86) PCT No.: PCT/US2004/016814

§ 371 (c)(1), (2), (4) Date: Nov. 16, 2006

(87) PCT Pub. No.: WO2005/118720

PCT Pub. Date: Dec. 15, 2005

(65) Prior Publication Data

US 2007/0276055 A1 Nov. 29, 2007

(51) Int. Cl.
C09K 21/00 (2006.01)
C08J 9/00 (2006.01)
C08G 18/28 (2006.01)

(52) U.S. Cl. .......................... 252/609; 521/82; 521/114
(58) Field of Classification Search .................. 521/85, 521/114; 428/413; 252/350, 182
See application file for complete search history.

(56) References Cited

U.S. PATENT DOCUMENTS

| | | | |
|---|---|---|---|
| 3,278,580 A | 10/1966 | Worsley et al. | |
| 3,405,162 A | 10/1968 | Kuryla | |
| 3,454,530 A | 7/1969 | Case et al. | |
| 3,497,465 A | 2/1970 | Kujawa et al. | |
| 3,624,044 A | 11/1971 | Wu | |
| 3,639,531 A | 2/1972 | Wu | |
| 3,660,502 A | 5/1972 | Case | |
| 3,662,029 A | 5/1972 | Wu | |
| 3,662,030 A | 5/1972 | Wu | |
| 3,662,038 A | 5/1972 | Wu | |
| 3,667,984 A | 6/1972 | Adams | |
| 3,723,365 A | 3/1973 | Speranza et al. | |
| 3,781,229 A | 12/1973 | Smith et al. | |
| 3,856,720 A | 12/1974 | Dieter et al. | |
| 3,892,687 A | 7/1975 | Bechara et al. | |
| 3,897,399 A | 7/1975 | Newton | |
| 3,903,054 A | 9/1975 | Cantor et al. | |
| 3,954,684 A | 5/1976 | Farrissey, Jr. et al. | |
| 4,067,687 A * | 1/1978 | Donaldson et al. ............. | 8/181 |
| 4,137,265 A | 1/1979 | Edwards et al. | |
| 4,209,609 A | 6/1980 | Haas | |
| 4,230,824 A | 10/1980 | Nodelman | |
| 4,254,000 A | 3/1981 | Ohmori et al. | |
| 4,258,137 A | 3/1981 | Cogliano | |
| 4,273,598 A | 6/1981 | Bowditch | |
| 4,357,463 A | 11/1982 | Blount | |
| 4,377,646 A | 3/1983 | Blount | |
| 4,404,121 A | 9/1983 | Klein et al. | |
| 4,468,481 A * | 8/1984 | Barda et al. .................. | 521/171 |
| 4,493,913 A | 1/1985 | Hirobe et al. | |
| 4,546,120 A | 10/1985 | Peerman et al. | |
| 4,751,252 A * | 6/1988 | Clatty ......................... | 521/114 |
| 4,766,158 A | 8/1988 | Fuzesi et al. | |
| 4,820,810 A | 4/1989 | Klein et al. | |
| 4,886,848 A | 12/1989 | Nishiyama et al. | |
| 4,904,704 A | 2/1990 | Nafziger et al. | |
| 4,940,632 A | 7/1990 | Nicola et al. | |
| 5,019,602 A | 5/1991 | Lowe | |
| 5,102,919 A | 4/1992 | Swab | |
| 5,246,978 A | 9/1993 | Ozaki et al. | |
| 5,356,943 A | 10/1994 | Dueber et al. | |
| 5,401,824 A | 3/1995 | Clatty et al. | |

(Continued)

FOREIGN PATENT DOCUMENTS

CA 781048 6/1967

(Continued)

OTHER PUBLICATIONS

Hexion Specialty Chemicals, Inc. "Heloxy Epoxy Functional Modifiers Product Overview." 2009. pp. 4-6.*

(Continued)

*Primary Examiner*—Randy Gulakowski
*Assistant Examiner*—Kara Negrelli
(74) *Attorney, Agent, or Firm*—Jeremy J. Kliebert

(57) ABSTRACT

A free-flowing, stable liquid flame retardant mixture comprised of or formed by mixing together components comprised of: A) at least one organic halogen-containing reactive flame retardant in which the halogen is bromine, chlorine or both; and B) a liquid additive that is comprised of at least one aliphatic polyepoxide of the formula $R(EP)_n$, wherein R is a straight chain or branched chain aliphatic moiety which consists of carbon, hydrogen, and optionally, one or more ether oxygen atoms and/or one or more epoxy oxygen atoms; Ep is a terminal epoxy group: and n is a whole or fractional number in the range of 2 to about 6. Such mixtures can be effectively used in the preparation of flame retardant rigid polyurethanes and rigid foams thereof, and rigid polyisocyanurate and rigid foams thereof. Component B) serves as an effective hardener for such polymers and foams. It is preferable to include in the liquid flame retardant mixture one or more phosphorus-containing flame retardant additives such a fully-esterified ester of a pentavalent acid of phosphorus, e.g., an organic phosphate or organic phosphonate.

15 Claims, No Drawings

U.S. PATENT DOCUMENTS

| | | | |
|---|---|---|---|
| 5,561,172 A | 10/1996 | Omure et al. | |
| 5,563,180 A | 10/1996 | Skowronski et al. | |
| 5,567,763 A | 10/1996 | Madan et al. | |
| 5,667,893 A * | 9/1997 | Kinzer et al. | 428/413 |
| 5,895,793 A * | 4/1999 | Kitamura et al. | 516/10 |
| 5,962,541 A | 10/1999 | Peterson et al. | |
| 5,985,985 A * | 11/1999 | Weingart et al. | 524/590 |
| 6,028,122 A | 2/2000 | Everitt et al. | |
| 6,117,937 A * | 9/2000 | Matsumoto et al. | 524/765 |
| 6,121,338 A | 9/2000 | Colman | |
| 6,166,109 A | 12/2000 | Spitler et al. | |
| 6,599,952 B2 | 7/2003 | Adkins et al. | |
| 2001/0014399 A1* | 8/2001 | Jasne | 428/413 |
| 2003/0065045 A1 | 4/2003 | Falke et al. | |

FOREIGN PATENT DOCUMENTS

| | | |
|---|---|---|
| CN | 1110691 | 10/1995 |
| CN | 1227230 | 9/1999 |
| DE | 1903692 | 8/1970 |
| DE | 2040105 | 2/1972 |
| DE | 136833 Z | 8/1979 |
| DE | 146608 Z | 2/1981 |
| DE | 200427 Z | 5/1983 |
| DE | 212967 A1 | 8/1984 |
| DE | 216247 A1 | 12/1984 |
| DE | 219204 A1 | 2/1985 |
| DE | 232714 A1 | 2/1986 |
| DE | 238985 A1 | 9/1986 |
| DE | 254390 A1 | 2/1988 |
| DE | 290201 A5 | 5/1991 |
| DE | 4200325 | 7/1993 |
| DE | 19638257 | 3/1998 |
| DE | 19736574 | 2/1999 |
| DE | 19924770 | 12/2000 |
| DE | 19924771 | 12/2000 |
| DE | 10237910 | 2/2004 |
| EP | 0116758 | 8/1984 |
| EP | 0491232 | 6/1992 |
| FR | 1463233 | 12/1966 |
| GB | 994087 | 6/1965 |
| GB | 1139874 | 1/1969 |
| GB | 1422230 | 1/1976 |
| GB | 1598432 | 9/1981 |
| GB | 2102822 A | 2/1983 |
| GB | 2255097 A | 10/1992 |
| JP | 48000798 A2 | 1/1973 |
| JP | 51128399 | 9/1976 |
| JP | 52022096 | 2/1977 |
| JP | 52041677 A2 | 3/1977 |
| JP | 52063997 | 5/1977 |
| JP | 56043323 | 4/1981 |
| JP | 56061421 | 5/1981 |
| JP | 56133321 | 10/1981 |
| JP | 58032625 | 2/1983 |
| JP | 58096619 | 6/1983 |
| JP | 61069825 | 4/1986 |
| JP | 62174091 | 7/1987 |
| JP | 2166112 | 6/1990 |
| JP | 5043487 | 2/1993 |
| JP | 5043488 | 2/1993 |
| JP | 5043489 | 2/1993 |
| JP | 5043490 | 2/1993 |
| JP | 5043491 | 2/1993 |
| JP | 5043492 | 2/1993 |
| JP | 7109324 | 4/1995 |
| JP | 2000017040 | 1/2000 |
| JP | 2000110302 | 4/2000 |
| JP | 2001172355 | 6/2001 |
| JP | 2003081975 | 3/2003 |
| RO | 92989 B1 | 11/1987 |
| RU | 2081127 C1 | 6/1997 |
| WO | WO 0035999 A1 | 6/2000 |
| WO | WO-03/076488 | 9/2003 |
| WO | WO-2004/003050 A1 | 1/2004 |

OTHER PUBLICATIONS

Hexion Specialty Chemicals, Inc. "Heloxy Epoxy Functional Modifiers Product Overview." 2009. pp. 4-6.*

IUPAC Compendium of Chemical Terminology (Gold Book), Defintion of "Aliphatic Compounds." Second Edition, 1997.*

CAPLUS Abstract of Bilyk et al., "Urethane Foams From Animal Fats: X. Urethane Polyols From Epoxidized Tallow, Trimethylolpropane, and Propylene Oxide", Journal of the American Oil Chemists' Society, 1977, pp. 160-162, vol. 54(4). Accession No. 1977:172219 CAPLUS.

CAPLUS Abstract of Doerge et al., "CFC and HCFCs in Mixtures With Organic Liquids as Blowing Agents for Rigid Foams", Proceedings of the SPI Annual Technical/Marketing Conference, 1990, pp. 82-29, 33$^{rd}$. Accession No. 1991:537425 CAPLUS.

CAPLUS Abstract of Hashida et al., "Improvement of Thermal Insulation for Polyurethane Foam by the Conversion of Carbon Dioxide to an Organic Carbonate Compound", High Performance Polymers, 1998, pp. 81-91, vol. 10(1). Accession No. 1998:235926 CAPLUS.

CAPLUS Abstract of Jensen et al., "Tetrabromophthalate Diol: A Versatile Approach to Flame Retarding Rigid Polyurethane Foam with Low Smoke Evolution", Journal of Fire Retardant Chemistry, 1982, pp. 209-214, vol. 9(4). Accession No. 1984:122013 CAPLUS.

CAPLUS Abstract of Nicola et al., "Hydrocarbon Blown Foams for U.S. Construction Applications", Polyurethanes 94, Proc. Polyurethanes Conf., 1994, pp. 412-417. Accession No. 1995:536150 CAPLUS.

CAPLUS Abstract of Reichmann et al., "Class 1-Rated Polyurethane Foam Systems for Continuously Produced Metal Panels", Proceedings of the SPI Annual Technical/Marketing Conference, 1988, pp. 370-373, 31$^{st}$. Accession No. 1989:459097 CAPLUS.

CAPLUS Abstract of Saggese et al., "Urethane Foams From Animal Fats: XI. Urethane Polyols From Epoxidized Tallow, Sorbitol, or Trimethylolpropane and Propylene Oxide; Preparation and Properties of Rigid Foams", Journal of Cellular Plastics, 1980, pp. 102-112, vol. 16(2). Accession No. 1980:472680 CAPLUS.

CAPLUS Abstract of Schuetz et al., "Development of Polyurethane-Based Hydrophobic Insulating Compounds With Longterm Thermal and Vapor Diffusion Resistance", Sci. Tech. Aerosp. Rep., 1987, vol. 25(5), Abstr. No. N87-13564. Accession No. 1987:197488 CAPLUS.

CAPLUS Abstract of Studnicki et al., "Self-Extinguishing Polyurethane Foams Based on Chloroalkyl Phosphonates", Polimery (Warsaw, Poland), 1978, pp. 405-407, vol. 23(11). Accession No. 1979:104811 CAPLUS.

CAPLUS Abstract of Whinnery et al., "Tepic—A new High Temperature Structural Foam", Sandia National Laboratories [Technical Report] SAND, 1998, pp. 1-34, SAND98-8246. Accession No. 1999:667772 CAPLUS.

CAPLUS Abstract of Yoshida, "Recent Progress in Polyurethane Foam Technology", Netsu Kokasei Jushi, 1983, pp. 178-189, vol. 4(3). Accession No. 1984:140037 CAPLUS.

CAPLUS Abstract of Zhang et al., "Morphology, Mechanical Properties, and Thermal Stability of Polyurethane-Epoxide Resin Interpenetrating Polymer Network Rigid Foams", Journal of Applied Polymer Science, 2000, pp. 406-416, vol. 75(3). Accession No. 1999:785117 CAPLUS.

CAPLUS Abstract of Zhang et al., "Rigid Interpenetrating Polymer Network Foams Prepared From a Rosin-Based Polyurethane and an Epoxy Resin", Journal of Applied Polymer Science, 1998, pp. 271-281, vol. 69(2). Accession No. 1998:342321 CAPLUS.

Brominated Flame Retardants, Appendix 3, "Physical -chemical Properties of Brominated Flame Retardants", Website http://www.mst.dk/udgiv/Publications/1999/87/7909-416-3/html/bil03_eng.htm; Visited (Mar. 30, 2004); 18 pages.

D.E.R. 736, Dow Plastics Product Information, Form No. 296-01507-1001XSI.pdf, pp. 1-2.

D.E.R. 736, Material Safety Data Sheet, Website http://hazard.com/msds/mf/ems/files/13000.html; Visited (Mar. 30, 2004); 4 pages.

Draft—Table 4—Soil Screening Criteria (mg/kg) for Protedion of Indoor Air-Residential; 2 pages.

Akzo Nobel Chemicals; "Fryol-6", Fyrol Flame Retardant, Functional Chemicals/Phosphorus Chemicals; Nov. 1, 1998; Product Sheet; 1 page.

IXOL M 125—Datasheet, Solvay Fluor, Website http://www.solvayfluor.com/product/datasheet/0,5874,-_EN-1000285,00.html; Visited (May 5, 2004); 1 page.

IXOL B 251—Datasheet, Solvay Fluor, Website http://www.solvayfluor.com/product/datasheet/0,5874,-_EN-1000284,00.html; Visited (May 5, 2004); 3 pages.

Phosphoric Acid, Tris (2-chloro-1-methylethyl) Ester, National Institute for Occupational Safety and Health—The Registry of Toxic Effects of Chemical Substances, Website http://www.cdc.gov/niosh/rtecs/tc895440.html; Information Acquired (Mar. 30, 2004); full article printed May 10, 2007; 5 pages.

Aldrich Product No. 160466 1,2,5,6-Diepoxycyclooctane, Website http://www.sigmaaldrich.com/catalog/search/ProductDetail/ALDRIC...; Product Information Sheet; 1 page.

* cited by examiner

FLAME RETARDANT POLYURETHANES AND ADDITIVES THEREFOR

REFERENCE TO RELATED APPLICATIONS

This application is the National Stage of International Patent Appl. No. PCT/US04/16814 filed on May 28, 2004 the disclosure of which is incorporated herein by reference.

TECHNICAL FIELD

This invention relates to flame retardant rigid polyurethane foams, and to novel additive compositions, which can be used in forming such foams.

BACKGROUND

Rigid polyurethane foam is processed using a cast process or spray process. The cast process is generally utilized for block foam production, continuous double band lamination (DBL), and discontinuous panel production (DCP).

Block foam is produced by known discontinuous production or continuous rigid slab-stock production methods. If necessary for specialty products, the block foam is cut after production to the required shape, and is typically glued to facings to make the finished specialty product. Such products find use in the building industry, in truck insulation, and in the form of half shells for pipe insulation.

Double band lamination is a continuous panel production process with both sides laminated with all kind of flexible or rigid facing materials. The polyurethane foam core is sandwiched between those facings and applied as insulation for floors, walls and roofs. Sandwich panels with a rigid metal facing are structural building elements and can be applied as roof and wall construction elements such as cold-store panels, garage doors, refrigerated trucks, and for similar uses. Sandwich panels with non-metal rigid facing, e.g., gypsum board or wood, are used in the manufacture of prefabricated houses or other building structures.

Anyone unfamiliar with the art of forming polyurethanes, polyisocyanurates, or related polymers desiring any further details already known by those of ordinary skill in the art of producing polyurethane foams, polyisocyanurate foams, or polyurethane-modified polyisocyanurate foams may refer for example to U.S. Pat. Nos. 3,954,684; 4,209,609; 5,356,943; 5,563,180; and 6,121,338, and the references cited therein.

There has been a transition in the type of blowing agents over the last decade from CFC's to HCFC's in accordance with the Montreal Protocol because of the ozone depletion potential (ODP) of CFC's. For countries in which the use of CFC's was abolished, this conversion typically involved switching from CFC-11 to HCFC 141b. However, the industry must soon convert from HCFC's to a third generation blowing agent with non-ODP and low global-warming potential (GWP). Alternative blowing agents are HFC's and hydrocarbons.

In practice, systemhouses prepare ready-to-use blends of all ingredients but the isocyanate(s). Typical ingredients involved are polyols, chain extenders and/or crosslinkers, water as auxiliary blowing agent, flame-retardants, catalysts and surfactants.

Fire resistance is an important property of construction materials. Bromine, chlorine and phosphorus compounds or mixtures thereof have been used effectively to comply with applicable fire safety standards. However, in addition to high effectiveness as flame retardants, it is desired to provide liquid flame retardant compositions having low viscosity that can be easily incorporated in the various types of processes used in manufacturing of rigid polyurethane foams. In addition, such compositions need to have good shelf stability, and in order to be accepted in the marketplace such compositions need to be highly cost-effective to the user.

One objective of this invention is thus to provide effective, liquid flame retardant compositions with relative low viscosity that have good shelf stability and that can be easily blended with the other ingredients to obtain a system useful for producing flame retardant rigid polyurethane foam. Another objective is to provide a flame retardant composition which is particularly useful for double band lamination that provides good hardness development.

BRIEF SUMMARY OF THE INVENTION

The foregoing objectives can be successfully accomplished by providing in one embodiment of this invention a free-flowing non-viscous liquid flame retardant additive composition comprised of or formed by mixing together components comprised of:

A) at least one organic halogen-containing reactive flame retardant where the halogen is chlorine or bromine or both, preferably is at least one organic bromine-containing reactive flame retardant; and B) at least one liquid additive where the additive is comprised of at least one aliphatic polyepoxide and preferably is comprised of at least one aliphatic diepoxide.

As long as the additive composition is a free-flowing liquid, it can be of any suitable viscosity. Typically, however, the additive compositions of this invention have a Brookfield viscosity at 25° C. of about 10,000 centipoises (cps) or less, preferably 5,000 cps or less, more preferably 1000 or less, and most preferably such viscosity is about 500 centipoises or less.

As is well known in the art, a reactive flame retardant is one in which the compound contains at least one functional group, and usually more than one functional group, which is available to react with, and capable of reacting with, other polymer-forming components during polymerization so that the resultant polymer contains the flame retardant in chemically bound form in the polymer being formed. Terminal hydroxyl groups serve as one example of such reactive functional groups.

Among the various preferred embodiments of this invention is a free-flowing non-viscous liquid flame retardant additive composition comprised of or formed by mixing together components comprised of:

A) at least one organic halogen-containing reactive flame retardant where the halogen is chlorine or bromine or both, preferably is at least one organic bromine-containing reactive flame retardant;

B) at least one liquid additive where the additive is comprised of at least one aliphatic polyepoxide and preferably is comprised of at least one aliphatic diepoxide; and C) at least one organic phosphorus-containing flame retardant, which preferably is C1) at least one organic phosphate ester or C2) at least one organic phosphonate ester, and which most preferably is at least one organic phosphate ester and C2) at least one organic phosphonate ester.

Although various proportions of these components can be used, components A), B), and C) (when C) is other than a combination of C1) and C2)) preferably are present in, or are utilized in forming the additive composition in, an A):B):C) weight ratio in the range of about 85:2:13 to about 30:15:55, more preferably in the range of about 80:4:16 to about 50:16:34, with a ratio of about 74.5:6:19.5 being especially preferred.

A particularly preferred embodiment is a free-flowing non-viscous liquid flame retardant additive composition comprised of or formed by mixing together components comprised of:
A) at least one organic halogen-containing reactive flame retardant where the halogen is chlorine or bromine or both, preferably is at least one organic bromine-containing reactive flame retardant;
B) at least one liquid additive where the additive is comprised of at least one aliphatic polyepoxide and preferably is comprised of at least one aliphatic diepoxide; and
C1) at least one organic phosphate ester; and
C2) at least one organic phosphonate ester.

Here again, various proportions of these components can be used. However, components A), B), C1), and C2) preferably are present in, or are utilized in forming the additive composition in, an A):B):C1):C2) weight ratio in the range of about 85:2:12:1 to about 30:15:45:10, more preferably in the range of about 80:4:14:2 to about 50:16:26:8, with a ratio of about 74.5:6:16.5:3 being especially preferred.

In order to gain widespread acceptance in the marketplace, it is desirable that a flame retardant for rigid polyurethane foam have the capability of passing the very stringent French N FP 92-501 M-1 flammability test. A feature of this invention is that especially preferred compositions of this invention are capable of passing the M-1 flammability test. In fact, it has been found that even when rigid foam polyurethane samples have been blown using an exceptionally flammable blowing agent such as n-pentane, the incorporation into the polyurethane recipe of an especially preferred flame retardant additive composition of this invention enables the samples to pass the M-1 flammability test.

It is also desirable that a flame retardant for polyurethane rigid foam have the capability of passing the less severe German DIN 4102 B2 flammability test. The incorporation into the polyurethane recipe of various suitably-proportioned especially preferred flame retardant additive compositions of this invention enables the samples to pass the DIN 4102 B2 flammability test.

Still another embodiment of this invention is a flame-retardant composition which comprises a rigid polyurethane, a rigid polyisocyanurate, a rigid polyurethane foam, or a rigid polyisocyanurate foam, each of which is formed from components comprised of:
a) at least one organic polyisocyanate;
b) at least one isocyanate-reactive compound; and
c) a free-flowing non-viscous liquid flame retardant additive composition of this invention as described herein, which flame retardant composition can result from inclusion of components A) and B); or of components A), B), and C); or of components A), B), C1), and/or C2) (plus in each case other optional components) as separate components into the polyurethane-forming composition but preferably, at least components A) and B) (and if used, C) whether C) is C1 and/or C2 or is some other organic phosphorus-containing flame retardant) are used as a preformed additive composition of this invention.

When the flame retardant composition is a foam, component d) which is at least one blowing agent, is also used.

The above and other embodiments and features of this invention will be still further apparent from the ensuing description and ensuing claims.

FURTHER DETAILED DESCRIPTION OF THE INVENTION

The components used in forming the flame retardant additives of this invention from which the flame retardant rigid polyurethane foams of this invention are formed comprise:
A) at least one organic halogen-containing reactive flame retardant where the halogen is chlorine or bromine or both, which flame retardant preferably is a bromine-containing reactive flame retardant; and
B) at least one liquid additive where the additive is a polyepoxide and preferably a diepoxide; and optionally but preferably
C) at least one organic phosphorus-containing flame retardant, which most preferably is where C) is composed of:
   C1) an organic phosphate ester, and
   C2) an organic phosphonate ester.

The liquid additive(s) of component B) provide(s) improved hardness development in the foams that are flame retarded pursuant to this invention. Other components described hereinafter can be used in forming the compositions of this invention.

Component A)—Reactive Flame Retardants

Various organic halogen-containing reactive flame retardants are known and are available in the marketplace. Among preferred previously known organic halogen-containing reactive flame retardants for use in forming the additives of this invention are such reactive bromine flame retardants as SAYTEX® RB-79 flame retardant (having a nominal structure of a mixed ester of tetrabromophthalic anhydride with diethylene glycol and propylene glycol; Albemarle Corporation), tetrabromobisphenol-A, tetrachlorobisphenol-A, tribromoneopentyl alcohol and/or derivatives thereof, dibromobutenediol and/or derivatives thereof, and dibromoneopentyl glycol and/or derivatives thereof.

Two additional types of previously publicly unknown organic bromine-containing reactive flame retardants for use in this invention are either:
I) a flame retardant formulation comprised of (1) at least one bromine-containing polyol reactive flame retardant formed from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, and a bromine content of at least about 40 wt %, and preferably above about 43 wt %; or
II) a flame retardant formulation comprised of (1) at least one bromine-containing polyol reactive flame retardant formed from the reaction of (a) tetrabromophthalic anhydride, (b) an aliphatic polyol, and (c) an epoxide, and (2) at least one aliphatic diester of an alkane dicarboxylic acid, wherein the bromine content of said formulation is above 40 wt % and wherein said formulation further comprises (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of less than about 100 cps at 25° C., in an amount such that the viscosity of the resultant formulation is below 20,000 cps at 25° C. and is lower than the viscosity of the same formulation devoid of (X), (Y), and (Z), and such that the bromine content, exclusive of (X), (Y), and (Z), is at least 40 wt %, and preferably above about 43 wt %.

A bromine-containing polyol reactive flame retardant as described in (1) of each of I) and II) above, is commercially-available from Albemarle Corporation as SAYTEX® RB-79 flame retardant which has the nominal structure of a mixed ester of tetrabromophthalic anhydride with ethylene glycol and propylene glycol. As indicated above, SAYTEX RB-79® flame retardant is itself a reactive flame retardant.

The low viscosity flame retardant formulations of I) and II) above are fully described in U.S. patent application Ser. No. 10/651,823, filed Aug. 29, 2003.

There are four groups of previously publicly unknown organic bromine-containing reactive flame retardants for use in this invention which will now be described.

Group 1

One group of these new flame retardant formulations is comprised of (1) at least one bromine-containing polyol flame retardant made from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about o about 220. In addition, typically the formulation will have an acid number of no more than about 0.5 mg KOH/g of formulation, and preferably no more than about 0.2 mg KOH/g of formulation.

The aliphatic ester groups of component (2) above, which can be the same or different, are $C_{1-10}$ aliphatic groups which can be straight-chain or branched-chain. Also, these aliphatic groups can be saturated or they can be unsaturated, especially with one or more olefinic bonds. Use of esters having straight-chain aliphatic ester groups is preferred, and more preferred are esters having straight-chain alkyl ester groups. While the alkane moiety can contain up to 10 carbon atoms, dialiphatic esters of $C_2$ to $C_6$ saturated dicarboxylic acids are preferred.

A particularly preferred group of fully saturated straight-chain dicarboxylic acid esters is composed of a single ester or a combination of esters represented by the formula: $R^2$—OOC—$R^1$—COO—$R^3$ wherein $R^1$ is —$(CH_2)_w$—; $R^2$ is —$(CH_2)_x$—$CH_3$; and $R^3$ is —$(CH_2)_y$—$CH_3$; and in which w is a number from 2 to 4, and each of x and y is, independently, a number from 0 to 5. More preferred is a single ester or a combination of esters of this formula where $R^2$ and $R^3$ are methyl, ethyl, n-propyl, n-butyl, or isobutyl and especially where such $C_{1-4}$ alkyl groups are the same. Even more preferred are the dimethyl esters of succinic acid or glutaric acid or adipic acid, or any mixture of any two or all three of these.

The polyol flame retardants of (1) can be made from a variety of aliphatic polyols and epoxides. Among suitable aliphatic polyols are included, for example, ethylene glycol, propylene glycol, the isomeric butylene glycols, diethylene glycol, 1,5-pentanediol, 1,6-hexanediol, triethylene glycol, glycerol, trimethylolethane, trimethylolpropane, 1,2,6-hexanetriol, pentaerythritol, tetraethylene glycol, dipentaerythritol, sorbitol, sucrose, and alpha-methylglycoside. Mixtures of two or more such aliphatic polyols can be used if desired. Typically, the aliphatic polyol(s) used will contain up to about 18 carbon atoms per molecule.

Non-limiting examples of epoxides that can be used in the production of the polyol flame retardants of (1) include ethylene oxide, propylene oxide, epichlorohydrin, epibromohydrin, 1,2-butylene oxide, 2,3-butylene oxide, 1,2-pentylene oxide, 2,3-pentylene oxide, and any of the several hexylene oxides, heptylene oxides, octylene oxides, 1,2-epoxy dodecane, styrene oxide, and the like. Mixtures of two or more such epoxides can be used. Typically the epoxide(s) used can contain up to about 12 carbon atoms per molecule.

In preparing the polyol flame retardants of (1) a two step reaction is typically employed. In the first step, the tetrabromophthalic anhydride is reacted with the aliphatic polyol. A suitable catalyst is introduced into the reaction mixture. Among suitable catalysts are, for example, magnesium oxide, sodium acetate, potassium acetate, sodium carbonate, and potassium carbonate. Trialkylamines are also suitable catalysts. If desired, an inert solvent such as an inert liquid hydrocarbon can be employed in the first step. In the second step, the epoxide or mixture of epoxides is introduced into the reaction product mixture formed in the first step.

In forming the polyol flame retardants of (1) various ratios of the reactants can be used. Typically these ratios are expressed in terms of equivalents. An equivalent weight of tetrabromophthalic anhydride is one-half of its molecular weight. An equivalent weight of an aliphatic polyol is its molecular weight divided by the number of reactive hydroxyl groups. An equivalent weight of a monoepoxide is one-half its molecular weight. A typical reactant ratio is one equivalent of tetrabromophthalic anhydride to 0.5-10 equivalents of aliphatic polyol to 0.5-20 equivalents of epoxide. A more preferred reactant ratio is one equivalent of tetrabromophthalic anhydride to 0.75-2.0 equivalents of polyol to 1-10 equivalents of epoxide. Most preferred ratios are one equivalent of tetrabromophthalic anhydride with 0.9-1.5 equivalents of aliphatic polyol and 1-5 equivalents of epoxide. Temperatures used in the two steps of the reaction will typically fall within the range of about 100 to about 150° C.

Further details concerning the preparation of polyol flame retardants of (1) can be found, for example, in U.S. Pat. Nos. 3,455,886; 4,144,395; 4,564,697; and 5,332,859.

The other component used in the formulations of this first group of new flame retardants is at least one liquid straight-chain aliphatic diester of a straight-chain alkane dicarboxylic acid. Non-limiting examples of such diesters include dimethyloxalate, diethyloxalate, di-n-propyloxalate, di-n-butyloxalate, diisopropyloxalate, diisobutyloxalate, dipentyloxalate, methylethyloxalate, methylbutyloxalate, dimethylmalonate, diethylmalonate, di-n-propylmalonate, di-n-butylmalonate, diisopropylmalonate, diisobutylmalonate, dipentylmalonate, methylethylmalonate, methylbutylmalonate, dimethylsuccinate, diethylsuccinate, di-n-propylsuccinate, di-n-butylsuccinate, diisopropylsuccinate, diisobutylsuccinate, dipentylsuccinate, methylethylsuccinate, methylbutylsuccinate, dimethylglutarate, diethylglutarate, di-n-propylglutarate, di-n-butylglutarate, diisopropylglutarate, diisobutylglutarate, dipentylglutarate, methylethylglutarate, methylbutylglutarate, dimethyladipate, diethyladipate, di-n-propyladipate, di-n-butyladipate, diisopropyladipate, diisobutyladipate, dipentyladipate, methylethyladipate, methylbutyladipate, and analogous liquid straight-chain aliphatic diesters of straight-chain alkane dicarboxylic acids. Preferred as component of (2) of this embodiment are mixtures of such esters, especially mixtures of dimethyl esters. A few non-limiting examples of such preferred mixtures include 55-65 wt % of dimethylglutarate, 10-25 wt % of dimethyladipate, and 15-25% wt % of dimethylsuccinate; 72-77 wt % of dimethylglutarate and 20-28 wt % of dimethyladipate; 85-95 wt % of dimethyladipate and 5-15 wt % of dimethylglutarate; 65-69 wt % of dimethylglutarate and 31-35 wt % of dimethylsuccinate; 55-70 wt % of diisobutylglutarate, 10-20 wt % of diisobutyladipate, and 20-30 wt % of diisobutylsuccinate. Mixtures of this type are available as articles of commerce from DuPont Company.

The amount of component (2) used with component (1) is an amount sufficient to reduce the Brookfield viscosity of the resultant formulation to a suitably low level of about 20,000 cps or less at 25° C. while maintaining the bromine content of the formulation at a level of at least about 40 wt %. Preferably the resultant formulation has a Brookfield viscosity of about 15,000 cps or less, more preferably about 10,000 cps or less, and most preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

To form the formulations suitable mixing equipment such as a stirred tank should be used. Preferably, the mixing is conducted with agitation under an inert atmosphere such as nitrogen and with the application of thermal energy sufficient to raise the temperature of the mixture being formed to about 50 to about 100° C. The order of addition of the components is not critical and thus either component can be introduced into the mixing equipment before the other, or both components can be introduced concurrently into the mixing equipment. The time used in the mixing step and the rate of agitation should be sufficient to produce a homogeneous formulation.

Group 2

In this Group 2, the new flame retardant formulations are comprised of (1) at least one bromine-containing diol formed from (a) tetrabromophthalic anhydride; (b) diethylene glycol; (c) at least one alpha-omega alkane diol, or at least one alpha-omega alkane diol and at least one aliphatic monool; and (d) at least one alkylene oxide; and (2) at least one straight-chain aliphatic diester of a straight-chain alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

In this Group 2, the procedure and materials used are as described in connection with the above Group 1 except that component (1) is one or a mixture of new compounds. In addition, while the formulation can be formed by blending the components of this Group 2 after formation of component (1), it is desirable to utilize component (2) as an inert solvent for the preparation of the new compound or mixture of new compounds so that the resultant end product from the process already contains the desired component (2). Thus, the amount of component (2) used as a solvent can be adjusted relative to the reactants used in forming the new compound such that the proportions of components (1) and (2) in the finished product correspond to the desired proportions of the formulation. On the other hand, the amount of component (2) used as a solvent in the preparation of the new compound(s) can be less than that desired in the resultant formulation. In this case, an additional quantity of component (2) should be added to the product formed in the process to bring the level of component (2) in the resultant formulation up to the desired proportion. Conversely, in preparing the new compound of this invention, an excess amount of component (2) can be used as a solvent for the reaction producing the new compound(s) whereby the resultant reaction product will contain more of component (2) relative to component (1) than desired. In this case such excess of component (2) can be removed from the resultant reaction product by reduced pressure distillation so that the finished product of this Group 2 contains the desired amount of component (2) relative to component (1).

The new flame retardant compounds used in forming the low viscosity flame retardant formulations of this Group 2 of flame retardants are bromine-containing diols formed from:
a) tetrabromophthalic anhydride;
b) diethylene glycol;
c) one of the following:
   1) at least one alpha-omega alkane diol; or
   2) at least one alpha-omega alkane diol and at least one aliphatic monool;
d) at least one alkylene oxide; with the proviso that the compounds have a Brookfield viscosity at 25° C. of about 60,000 cps or less, preferably about 40,000 cps or less, more preferably about 25,000 cps or less, and a bromine content of at least about 43 wt % and preferably above about 45 wt %.

The new flame retardant compounds used in forming the low viscosity flame retardant formulations of this Group 2 are typically formed by a two-step reaction. In the first step, (i) tetrabromophthalic anhydride, and (ii) diethylene glycol, (iii) at least one alpha-omega alkane diol, or at least one alpha-omega alkane diol and at least one aliphatic monool; are brought together in proportions of about 0.1 to about 1.1 moles of (ii) per mole of (i), and about 0.1 to about 1.1 moles of (iii) per mole of (i) such that there is a total of about 0.5 to about 1.8 moles of (ii) and (iii) per mole of (i). In this connection, when a combination of at least one alpha-omega alkane diol and at least one aliphatic monool is used as (iii), the alpha-omega alkane diol(s) and the aliphatic monool(s) can be used in any proportions relative to each other.

This first-step reaction is typically performed at about atmospheric pressure and at a temperature in the range of about 110° C. to about 140° C., and preferably in the range of about 120 to about 130° C.

Various alpha-omega alkane diols can be used in conducting this first step reaction. Thus, use can be made of such alkane diols as 1,2-ethanediol, 1,3-propanediol, 1,4-butanediol, 1,5-pentanediol, 1,6-hexanediol, 1,7-heptanediol, 1,8-octanediol, and their higher homologs. Preferably the alpha-omega alkane diol(s) used will contain in the range of 2 to about 8 carbon atoms per molecule, and more preferably in the range of 2 to about 4 carbon atoms per molecule.

If one or more aliphatic monools are used in the first-step reaction, the aliphatic monool can be straight-chain or branched-chain and they can be saturated or unsaturated, and if unsaturated, preferably, olefinically unsaturated. In addition aliphatic portion of the monools can contain one or more ether oxygen atoms. Non-limiting examples of such aliphatic monools include methanol, ethanol, 1-propanol, 2-propanol, 1-butanol, 2-butanol, 2-methyl-1-propanol, 2-methyl-2-propanol, 2-methyoxyethanol, 2-ethoxyethanol, diethylene glycol monomethylether, allyl alcohol, 3-butenol, 1-hexanol, 2-ethylhexanol, isodecyl alcohol, and the like. Typically, the aliphatic monool will contain in the range of 1 to about 10 carbon atoms per molecule. Preferably the aliphatic monool(s) used will contain in the range of 1 to about 4 carbon atoms per molecule.

In the second step, the product of the above reaction is contacted with at least one alkylene oxide. For the purposes of this invention, and unless expressly specified otherwise, the term "alkylene oxide" includes haloalkylene oxides. Thus, use can be made of such alkylene oxides as ethylene oxide, propylene oxide, epichlorohydrin, epibromohydrin, 1,2-butylene oxide, 2,3-butylene oxide, 1,2-epoxypentane, 2,3-epoxypentane, 1,2-epoxyhexane, 2,3-epoxyhexane, 3,4-epoxyhexane, and their higher homologs. Mixtures of two or more such alkylene oxides can be employed if desired. The alkylene oxide(s) used will typically contain in the range of 2 to about 10 carbon atoms per molecule. Preferred alkylene oxides will contain in the range of 2 to about 4 carbon atoms per molecule. The proportions used are such that there are in the range of about 1.2 to about 1.9 moles of one or more alkylene oxides per mole of tetrabromophthalic anhydride used in the first step reaction, and such that the acid number (as determined by aqueous sodium hydroxide titration and as expressed in terms of potassium hydroxide) is less than 0.4 and preferably less than 0.2 milligrams of KOH per gram of undiluted product. This second step reaction is typically conducted at a temperature in the range of about 110 to about 140° C., and preferably in the range of about 120 to about 130° C. under pressures in the range of about 10 to about 100 psi, and preferably in the range of about 20 to about 50 psi.

In selecting the alpha-omega alkane diol and, if used the aliphatic monool, the molecular weight of such compound(s) and the proportion thereof used in the reaction tend to be inversely proportional. For example, when using one or more higher molecular weight alpha-omega alkane diols alone as reactant (iii) above the proportion thereof should be kept relatively low within the above specified ranges in order to ensure that the final product will meet the bromine content parameter. Similar considerations apply when using one or more higher molecular weight aliphatic monools along with one or more higher molecular weight alpha-omega alkane diols.

Although typically unnecessary, either or both of the foregoing two step reactions can be conducted in the presence of an inert solvent such as an inert liquid hydrocarbon. However, if such a hydrocarbon solvent is used, it is desirable to remove the solvent such as by flashing or distillation upon completion of the reaction.

Groups 3 and 4

Particularly preferred flame retardants are formulations as above described in connection with Group 1 or Group 2 with which are blended (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of less than 100 cps at 25° C. These formulations of Groups 3 and 4 typically have a viscosity at 25° C. of about 20,000 cps or less, preferably about 10,000 cps or less, more preferably about 6000 cps or less, and still more preferably about 4000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

Non-limiting examples of liquid monohalohydrocarbons and polyhalohydrocarbons that can be used in forming the formulations of Groups 3 and 4 include n-propyl chloride, n-propyl bromide, isopropyl chloride, isopropyl bromide, butyl chloride, butyl bromide, isobutyl chloride, isobutyl bromide, higher homologs of these alkyl monohalides, methylene chloride, bromochloromethane, methylene bromide, ethylene dichloride, ethylene dibromide, 1,1,2-trichloroethane, 1,1,1-trichloroethane, trichloroethylene, chloroform, chlorobenzene, bromobenzene, cyclohexylchloride, cyclohexylbromide, and analogous halohydrocarbons in which the halogen content is either chlorine or bromine, or both. Non-limiting examples of polyhalocarbons that can be used include carbon tetrachloride, carbon tetrabromide, perchloroethylene, and the like. The liquid monohalohydrocarbons and polyhalohydrocarbons that are devoid of unsaturation are preferred.

The amount of liquid mono- or polyhalohydrocarbon(s) and/or liquid polyhalocarbon(s) used in forming the formulations of this Groups 3 and 4 can be varied so long as the viscosity of the resultant formulation is about 20,000 cps or less and the bromine content of the resultant formulation is at least about 40 wt %. Generally speaking, the requisite amount of liquid mono- or polyhalohydrocarbon(s) and/or liquid polyhalocarbon(s) will typically fall within the range of about 0.1 to about 15 wt % based on the total weight of the formulation. However, departures from this range are permissible whenever deemed necessary or advisable in achieving the desired viscosity and bromine content parameters, and are within the contemplation and scope of this invention.

The blending procedures, mixing equipment, and conditions for the mixing or blending (including temperatures) are the same as described above.

Several commercially available proprietary bromine-containing reactive flame retardant compositions which are well-suited for use in the practice of this invention are SAYTEX® RB-8000 flame retardant (a stable highly reactive bromine-containing aromatic diol having all primary hydroxyls and made from tetrabromophthalic anhydride; Albemarle Corporation); SAYTEX® RB-9130 flame retardant and SAYTEX® RB-9170 flame retardant (reactive diols for rigid polyurethane and polyisocyanurate foams having a high aromatic bromine content, high reactivity, scorch resistance, and low viscosity). Typical properties of these products as identified by the manufacturer are as set forth in Table A.

TABLE A

|  | RB-8000 | RB-9130 | RB-9170 |
|---|---|---|---|
| Typical Properties |  |  |  |
| Appearance/form | amber/liquid | amber/liquid | amber/liquid |
| Viscosity (cps at 25° C.) | 40,000-60,000 | 4000-6000 | 2000-4000 |
| Halogen (wt %) | 45 | 43 | 43 |
| Specific Gravity | 18 | 1.75 | 1.75 |
| Bulk Density, lb/gal (kg/m$^3$) | 15.02 (1800) | 14.6 (1750) | 14.6 (1750) |
| Hydroxyl No. | 220-250 | 120-140 | 160-180 |
| Acid No. (mg KOH/g) | 0.50 max. | 0.50 max. | 0.50 max. |
| Water (wt %) max. | 0.20 | 0.20 | 0.20 |
| Solubility (wt %, 25° C.) |  |  |  |
| n-pentane | 1.9 | 2.6 | 2.4 |
| Cyclopentane | 3.6 | 5.5 | 5.4 |
| HCFC 245fa | — | 10.0 | 10.0 |

Suitable bromine-containing polyol reactive flame retardants formed from the reaction of (a) tetrabromophthalic anhydride with (b) an aliphatic polyol to form an acid-ester, followed by reaction of said acid-ester with (c) ethylene oxide or propylene oxide, or both, include some of the commercially-available products described herein.

Component B)—Aliphatic Polyepoxides and Aliphatic Diepoxides

The term "polyepoxides" as used herein is generic to and thus includes the term "diepoxides". The aliphatic polyepoxides used as component B) in the compositions of this invention can in general be depicted by the formula R(Ep)$_n$ wherein R is a straight chain or branched chain aliphatic moiety which consists of carbon, hydrogen, and optionally, ether and/or epoxy oxygen atoms; Ep is a terminal epoxy group:

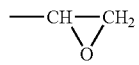

and n is a whole of fractional number in the range about 2 to about 6, and preferably in the range about 2 to about 4. A fractional number exists when two or more aliphatic polyepoxides are used as component B) in the compositions of this invention. When n is a whole number either a single polyepoxide is used or a mixture of two or more polyepoxides is used in which the average number of the terminal epoxy groups numerically averages to a whole number.

The aliphatic diepoxides, which are a preferred group of aliphatic polyepoxides, are described by the above formula where n is two. One or more such aliphatic diepoxides can be used in forming the flame retardant compositions of this invention.

Non-limiting examples of aliphatic polyepoxides which can be used include 1,4-butanediol diglycidyl ether, 1,2,7,8-diepoxyoctane, diethylene glycol diglycidyl ether, dipropylene glycol diglycidyl ether, dibutylene glycol diglycidyl ether, trimethylolpropane triglycidyl ether, pentaerytritol tetraglycidyl ether, and analogs, and homologs thereof.

Preferred aliphatic polyepoxides are the aliphatic diepoxides. Of these, more preferred aliphatic diepoxides are compositions such as are available as articles of commerce which typically are in the form of resins. Among such more preferred aliphatic diepoxides are D.E.R. 732 epoxy resin and D.E.R. 736 epoxy resin (The Dow Chemical Company). Typical properties of these liquid epoxy resins (which are based on polyglycol diepoxides) are set forth in the following Table 1.

TABLE 1

| Resin | Epoxide Equiv. Wt. | Viscosity Range (cps @ 25° C.) | Color Max. (APHA) | Flash Point, ° F.* | Specific Gravity, 25/25° C. | Weight (lbs/gal) @25° C. |
|---|---|---|---|---|---|---|
| D.E.R. 732 | 305-335 | 55-100 | 125 | 310 | 1.06 | 8.9 |
| D.E.R. 736 | 175-205 | 30-60 | 125 | 320 | 1.14 | 9.5 |

*Pensky-Martens Closed Cup

Addition of the aliphatic polyepoxides or the preferred aliphatic diepoxides to the precursor foam-forming composition increases the hardness development of the foam. This feature of these aliphatic polyepoxides and aliphatic diepoxides was found by surprise and the chemistry behind this phenomenon is unknown to the inventor. Hardness development is of particular importance for continuous produced sandwich panels as this property relates to the economics of production. Furthermore, the liquid flame retardant additive compositions of this invention, whether the components thereof are used individually and/or in subcombinations, or in a single preformed additive composition ("package"), make it possible to satisfy the need for sandwich panels that meet national or European flammability standards. In addition, such additive compositions of this invention enable the formation of rigid foamed polymer compositions of this invention that exhibit improved hardness development. Thus, this invention makes possible the achievement of these advantageous properties by use of the additive combinations of this invention which, when preformed, are in the form of a single composition comprised of or produced by mixing together at least components A) and B), preferably with the inclusion therein of component C) as well.

Component C)—Phosphorus-Containing Flame Retardants

In addition to the reactive halogen-containing flame-retardant(s), and the aliphatic polyepoxide and/or aliphatic diepoxide, at least one organic phosphorus-containing flame retardant can be used in the compositions of this invention. Preferably component C), the organic phosphorus-containing flame retardant, is C1) at least one organic phosphate ester or C2) at least one organic phosphonate ester. Typically, the organic phosphate esters are of the formula $(RO)_3P=O$, and the organic phosphonate esters are of the formula $(R)(RO)_2P=O$. In these formulas, R typically is, independently, a hydrocarbyl group, a monochlorohydrocarbyl group, a polychlorohydrocarbyl group, a monobromohydrocarbyl group, or a polybromohydrocarbyl group. A few non-limiting examples of such compounds include trimethylphosphate, triethylphosphate, triisopropylphosphate, tributylphosphate, tritolylphosphate, di(phenyl)(tolyl)phosphate, tris(2-chloroethyl)phosphate, tris(2-chloroisopropyl)phosphate, tris(2-bromoethyl)phosphate, tris(2-bromoisopropyl)phosphate, dimethylmethanephosphonate, diethylethanephosphonate, tris(dichloropropyl)phosphate, and similar organic phosphorus flame-retardants. Apart from these phosphorus-containing flame-retardants, other organic or inorganic flame-retardants such as red phosphorus, ammonium polyphosphate, and melamine can be used.

A number of suitable organic phosphorus-containing flame retardants are available as articles of commerce. Two such preferred flame retardants are tris(2-chloroisopropyl)phosphate (ANTIBLAZE® TMCP flame retardant; Albemarle Corporation) and diethylethanephosphonate (ANTIBLAZE V490 flame retardant; Albemarle Corporation) which are very useful in the embodiments of this invention in which at least one organic phosphorus-containing flame retardant is incorporated into a composition of this invention. A commercially available flame retardant which contains a reactive bromine-containing diester/ether diol of tetrabromophthalic anhydride, described as a mixed ester of tetrabromophthalic anhydride with diethylene glycol and propylene glycol, in a blend with a liquid phosphate ester is SAYTEX® RB-7980 flame retardant, available from Albemarle Corporation.

Proportions Components A), B), and C)

As noted above, the additive compositions of this invention and the flame retardant content of the polyurethane compositions of this invention are comprised of or formed from at least components A) and B) which are: A) at least one organic halogen-containing reactive flame retardant where the halogen is chlorine or bromine or both, and B) at least one liquid additive where the additive is a polyepoxide and preferably a diepoxide. Optionally, but preferably, the compositions of this invention also contain or are formed from component C) which is at least one organic phosphorus-containing flame retardant. Preferred for use as component C) are C1), which is at least one organic phosphate ester or C2, which is at least organic phosphonate ester. All of the foregoing compositions typically have a Brookfield viscosity at 25° C. of about 10,000 centipoises (cps) or less, preferably 5000 cps or less, more preferably 1000 cps or less, and most preferably such viscosity is about 500 centipoises or less. Thus the proportions of components A), B), and C)—whether C) is C1) at least one organic phosphate ester or C2) at least one organic phosphonate ester or a mixture of both, or is some other organic phosphorus-containing flame retardant—used relative to each other can vary considerably depending upon the identities of components A) and B) and other components used, and the actual Brookfield value at 25° C. desired in any given situation. Accordingly, the foregoing components of the compositions of this invention are usually (but not necessarily) proportioned to produce a resultant flame retardant composition that will achieve the desired Brookfield viscosity at 25° C. such as those described above. In any case where such proportions are not already known, a few simple experiments with the selected components should readily enable the selection of proportions of the components that will achieve the desired Brookfield viscosity.

As noted above, this invention makes it possible to provide polymeric compositions that pass the N FP 92-501 M-1 flammability test. This can be accomplished for example by utilizing components A), B), C1), and C2) in proportions corresponding respectively to an A):B):C1):C2) weight ratio in the range of about 85:2:12:1 to about 30:15:45:10.

As also noted above, this invention makes it possible to provide polymeric compositions that pass the DIN 4102 B2 flammability test. For example, this may be accomplished with compositions wherein components A), B), C1) and C2) are present in, or are utilized in forming the additive composition in an A):B):C1):C2) weight ratio in the range of about 47:2:50:1 to about 20:30:30:20, preferably in the range of about 45:4:48:3 to about 25:20:35:15, more preferably in the range of about 42:8:45:6 to about 35:15:40:12, with a ratio of about 39.5:10:41.5:9 being especially preferred.

By use of experimental procedures described hereinafter, it is deemed likely that compositions comprised of components A), B), and C), in suitable proportions, where C) is other than a combination of C1) and C2), will result in polymer compositions that will pass at least one of the foregoing flammability tests.

Polymer Formation

For preparing the polyurethanes and polyisocyanurates, including the rigid foams, of this invention, individual or mixtures of polyols with hydroxyl values in the range of from 150 to 850 mg KOH/g, and preferably in the range of from 200 to 600 mg KOH/g, and hydroxyl functionalities in the range of from 2 to 8 and preferably in the range of from 3 to 8 are used. Suitable polyols meeting these criteria have been fully described in the literature, and include reaction products of (a) alkylene oxide such as propylene oxide and/or ethylene oxide, with (b) initiators having in the range of from 2 to 8 active hydrogen atoms per molecule. Suitable initiators include, for example, diols (e.g., diethylene glycol, bisphenol-A), polyesters (e.g., polyethylene terephthalate), triols (e.g., glycerine), novolac resins, ethylenediamine, pentaerythritol, sorbitol, and sucrose. Other usable polyols include polyesters prepared by the condensation reaction of appropriate proportions of glycols and higher functionality polyols with dicarboxylic or polycarboxylic acids. The polyether polyols can be mixed with polyester types. Other polyols include hydroxyl-terminated polythioethers, polyamides, polyesteramides, polycarbonates, polyacetals and polysiloxanes.

Usable organic polyisocyanates for use in the practice of this invention include any of those known in the art for the preparation of rigid polyurethane, and in particular the aromatic polyisocyanates such as diphenylmethane diisocyanate in the form of its 2,4-, 2,2- or 4,4-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be used include the aliphatic diisocyanates such as isophorone diisocyanate, 1,6-diisocyanatohexane and 4,4-diisocyanatodicyclohexylmethane.

To manufacture the foams, the organic and/or modified organic polyisocyanates are reacted with compounds with isocyanate reactive hydrogen atoms and optionally chain extenders or cross linkers in amounts such that the equivalent ratio of isocyanate groups versus the sum of the reactive hydrogen atoms of the components ranges from 0.85 to 30:1 and preferably in the range of 0.95 to 4:1.

Polyurethanes and rigid polyurethane foams can be prepared with or without chain extenders or cross-linkers. The mechanical properties can be modified by using these chemicals in the preparation of the polyurethanes and rigid foams of this invention. Usable chain extenders and/or cross-linkers are diols and/or triols with molecular weights lower than 250 and particularly between 50 and 200. Usable diols are aliphatic, cycloaliphatic or aromatic types, e.g., ethylene glycol, diethylene glycol, dipropylene glycol, and 1,4 butanediol. Usable triols include, for example, trimethylolpropane and glycerine.

When chain extenders and/or cross linkers are used to prepare the foams, normally they are applied in a loading of 0 to 20 weight percent and preferably from 2 to 10 weight percent relative to the weight of the polyols. Chemicals which have been widely used as blowing agent in the production of polyurethane foam are the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. If desired, such blowing agents can be used in the practice of this invention unless prohibited from use by law. As noted above, recent concern over the potential of chlorofluorocarbons to cause depletion of ozone in the atmosphere has led to an urgent need to develop reaction systems in which chlorofluorocarbon blowing agents are replaced by alternative materials which are environmentally acceptable and which also produce foams having the necessary properties for the many applications in which they are used. Initially, the most promising alternatives appeared to be hydrogen-containing chlorofluorocarbons (HCFC's) such as, e.g., 1,1-dichloro-1-fluoroethane (HCFC-141b). However, HCFC's also have some ozone-depletion potential. There is therefore mounting pressure to find substitutes for the HCFC's as well as the CFC's. Nevertheless, such blowing agents can be used in the practice of this invention to the extent their use is not prohibited by law.

Alternative blowing agents which are currently considered promising because they contain no ozone-depleting chlorine are partially fluorinated hydrocarbons (HFC's) and hydrocarbons (HC's), and these blowing agents can be used in the practice of this invention. Water can also be used as a single blowing agent or as a co-blowing agent in combination HCFC-, HFC- or HC blowing agents. Water will react with the isocyanate groups and form urea structures and release carbon dioxide.

To produce the polyurethane foam, a foam-producing amount of the blowing agent(s) is included in the reaction mixture before the polymer has been formed. Those foams have a density in the range from 20 kg/m$^3$ to 100 kg/m$^3$ and preferably from 25 kg/m$^3$ to 80 kg/m$^3$ and more preferably from 30 kg/m$^3$ to 45 kg/m$^3$. The amount of blowing agent will mainly determine the density of those foams. The amount will typically fall in the range of 1 to 10 per cent by weight based on the total weight of the reaction mixture being foamed.

Catalysts for rigid foam applications can be categorized as gel catalysts, blow catalysts, balanced gel/blow catalysts and trimerization catalysts. Gel catalysts promote the reaction between the reactive hydrogen atoms, particularly of the hydroxyl groups, and the modified polyisocyanates. Blow catalysts promote the reaction of the reactive hydrogen of water and the modified polyisocyanate. Suitable catalysts are tertiary amines, which can be used as a single catalyst. Examples of suitable tertiary amines as blowing catalyst include, e.g., bis(dimethylaminoethyl)ether and pentamethyldiethylentriamine. Examples of gel catalysts include 1,4-diaza(2,2,2)bicyclooctane; tetramethyldipropylentriamine; tris(dimethylaminopropyl)hydrotriazine. Examples of balanced catalysts include dimethylcyclohexylamine, pentamethyldipropylenetriamine and tris(dimethylaminopropyl)hydrotriazine. The catalysts are usually used in amounts of from 0.001 to 2 parts by weight per 100 parts by weight of the polyol blend.

Surfactants can be used in the formulation if desired. They serve as a surface-active substance in order to improve the compatibility of the various components of the formulation and to control the cell structure. Examples of suitable surfactants are emulsifiers such as sodium salts of castor oil sulfates or fatty acids; fatty acid salts with amines, e.g., diethylamine oleate and diethanolamine stearate; salts of sulfonic acids, e.g., alkali metal or ammonium salts of dodecylbenzenedisulfonic acid and ricinoleic acid; foam stabilizers such as siloxaneoxyalkylene copolymers and other organopolysiloxanes, ethoxylated alkylphenols, ethoxylated fatty alcohols and castor oil. These surface-active substances are usually used in amounts of from 0.01 to 5 parts by weight based on 100 parts by weight of polyol blend.

Low viscosity liquid $C_{1-4}$ halocarbon and/or halohydrocarbon diluents in which the halogen content is 1-4 bromine and/or chlorine atoms can also be included in the compositions of this invention, provided they are used in small amounts, e.g., less than 2 wt % and preferably less than 1 wt % of the total weight of the additive composition of this invention. Non-limiting examples include bromochloromethane, methylene chloride, ethylene dichloride, ethylene dibromide, isopropyl chloride, n-butyl bromide, sec-butyl bromide, n-butyl chloride, sec-butyl chloride, chloroform, perchloroethylene, methyl chloroform, and carbon tetrachloride.

Proportions of Flame Retardant Compositions Used

The rigid polyurethane and polyisocyanurate foams contain a flame retardant amount of the additives of this invention. Typically, the additive compositions of this invention are used in amounts providing a bromine concentration in the polymer in the range of about 1 to about 30 wt % based on the total weight of the polymer and the additives of this invention, but excluding the weight of any cladding, lamination, or coatings on the polymer or foam. Preferably such total bromine concentration is in the range of about 5 to about 20 wt % and more preferably is in the range of about 10 to about 15 wt % based on the total weight of the polymer and the additives of this invention, but excluding the weight of any cladding, lamination, or coatings on the polymer or foam. Most preferably the amount of the flame retardants of this invention used is at least sufficient to meet the present flame retardant requirements of the N FP 92-501 M1 Test Procedure or the DIN 4102 B2 test procedure, or both such procedures.

Ways of Employing A) and B), with or without C), in Forming Flame Retardant Polymers In forming the flame retardant rigid polyurethanes, rigid polyurethane foams, rigid polyisocyanurates, and rigid polyisocyanurate foams of this invention a preformed free-flowing non-viscous liquid flame retardant additive composition of this invention as described herein is preferably employed. Use of such preformed additive composition is advantageous in that its typical low Brookfield viscosity facilitates mixing and easier formation of a more uniform blend from which the polymer or polymeric foam is to be produced. Also use of such preformed blend minimizes the likelihood of blending errors and in general, simplifies the polymer forming operation. However it is within the scope of this invention to introduce at least components A) and B), and if used, C), whether C) is C1) and/or C2), or is some other organic phosphorus-containing flame retardant, as separate or partially combined components into the respective polymer-forming and polymer foam-forming compositions. Similarly, it is preferred that any other optional component of the additive compositions of this invention has, or any other optional components of the additive compositions of this invention have, already been included in the preformed additive composition when such composition is used in forming a polymer-forming or polymer foam-forming composition. However, such optional component(s) can be used in forming a polymer-forming or polymer foam-forming composition separately or as one or more subcombinations such as with either component A) or component B) or component C) (if used) and/or as a subcombination of two or more such optional additives with or without one of Components A) or B) or C) (if used) when forming the respective polymer-forming and polymer foam-forming compositions. When blending components A) and B) and optionally C) separately in forming a polymer-forming or polymer foam-forming composition the amounts thereof can vary as long as the polymer-forming or polymer foam-forming composition can be converted into a suitable product having the physical properties desired, as provision of a low viscosity additive product is probably not of a primary concern to the operator in such a case.

The following Examples further illustrate the invention. These Examples are not intended to limit, and should not be construed as limiting, the generic scope of this invention.

Materials used in the Examples included the following:

Component A): A bromine-containing diester/diol of tetrabromophthalic anhydride (SAYTEX RB-79 flame retardant; Albemarle Corporation); tribromoneopentyl alcohol (TBNPA); CAS No. 36483-57-5

Component B): A liquid polyglycol diepoxide (D.E.R. 736P; The Dow Chemical Company)

Component C1): Tris(2-chloroisopropyl)phosphate (Antiblaze® TMCP Albemarle Corporation)

Component C2): Diethylethanephosphonate (Antiblaze® V490; Albemarle Corporation)

Polyol: Polyether polyol based on sorbitol having an OH number of 490 mg KOH/g, and a viscosity of 25,000 mPas·s at 25° C.

Polymeric Isocyanate: Universal MDI with average functionality and higher reactivity, with an NCO content of 31.2%, and a viscosity of 200 mPas·s at 25° C.

Foam stabilizer: Non-hydrolyzable polysiloxane-polyether-copolymer surfactant (DABCO® DC 5580, Air Products and Chemicals, Inc.)

Catalyst: Dimethylcyclohexylamine (POLYCAT® 8; Air Products and Chemicals, Inc.)

EXAMPLES 1-3

Flame retarded polyurethane compositions of this invention were formed from the components and in the proportions listed in Table 2. Also presented in the Table are the results on foam hardness of the polyurethane foams produced from the respective flame retarded compositions of this invention. Hardness development on the surface of the prepared foams was measured by reporting the force when a rod with a diameter of 25 millimeters was pushed into the foam at a speed of 100 millimeters/minute until a depth of 10 millimeters is reached. Desirably, the force required should be higher than a hardness of 30 N at 2.5 minutes after the components are mixed and polymerization is thus initiated.

TABLE 2

|  | Example 1 | Example 2 | Example 3 |
|---|---|---|---|
| Component |  |  |  |
| Polyol | 100 | 100 | 100 |
| SAYTEX RB79 flame retardant | 20.6 | 32 | 239 |
| TBNPA flame retardant | 25.6 | 20 | 0.00 |
| Antiblaze TMCP flame retardant | 31.8 | 33.6 | 53 |
| Antiblaze V490 flame retardant | 6.8 | 7.2 | 9.4 |
| D.E.R. 736P | 5.2 | 8 | 18.8 |
| Water | 3 | 3.2 | 6.9 |
| Catalyst | 4.8 | 5.1 | 6.9 |
| Stabilizer | 2.3 | 2.4 | 6.9 |
| n-Pentane | 12.1 | 12.8 | 22 |
| PMDI Index | 120 | 120 | 117 |
| DIN 4102 B2 (cm) | 12.3 | 12.3 | 10 |
| N FP 501-92 M rating | not tested | not tested | M1 |
| Hardness (N) Elapsed minutes |  |  |  |
| 2.5 | 34 | 31 | 33 |
| 3 | 50 | 46 | 39 |
| 4 | 73 | 68 | 60 |
| 5 | 88 | 96 | 76 |
| 6 | 114 | 109 | 91 |

EXAMPLE 4

An additive composition is formed from the following components in the proportions specified:

A) A mixed ester of tetrabromophthalic anhydride with diethylene glycol and propylene glycol (SAYTEX RB-79 flame retardant; Albemarle Corporation)-40.05 wt %
B) A liquid polyglycol diepoxide (D.E.R. 736; The Dow Chemical Company)-10 wt %
C) Tris(2-chloroisopropyl)phosphate (Antiblaze® TMCP Albemarle Corporation)-49 wt %
Other) Isopropyl chloride-0.95 wt %

EXAMPLE 5

A comparison was made as between a flame retarded rigid polyurethane foam composition of this invention comprised of components A) and B) and a corresponding composition comprised of component A) but without use of component B). The components used in forming these polymer foam compositions and the results on hardness development determined as described in Examples 1-3 are set forth in Table 3.

TABLE 3

|  | Foam Composition Not of This Invention | Foam Compsition of this Invention |
|---|---|---|
| Components |  |  |
| Polyol (Dow Vor 370) | 30 wt % | 30 wt % |
| Polyol Oxid TR-681 | 30 wt % | 30 wt % |
| RB-79 Flame Retardant (Component A) | 40 wt % | 32 wt % |
| D.E.R. 736 (Component B) | none | 8 wt % |
| Surfactant (Gold B8443) | 2.9 wt % | 2.9 wt % |
| Catlyst (Pmdeta, P-5, P-974) | 0.4 wt % | 0.4 wt % |
| Catalyst (TMR-2 P-9715) | 2.6 wt % | 2.6 wt % |
| Water | 1.1 wt % | 1.1 wt % |
| Cyclopentane | 23.5 wt % | 23.5 wt % |
| Compression, psi |  |  |
| 3.5 minutes | 9.4 | 13.7 |
| 4 minutes | 9.4 | 13.4 |
| 5 minutes | 9.9 | 13.2 |
| 6 minutes | 11.8 | 18.5 |
| 7 minutes | 12.1 | 19.4 |
| Peak, Time | 7 | 7 |
| Load | 12.1 | 19.4 |
| Aged PSI | 23.6 | 21.4 |
| Cell Wall | 694 | 786 |
| Cells/inch | 160 | 132 |

EXAMPLE 6

The procedure of Example 5 was repeated using a polyurethane foam made from a different set of components. The components used and the proportions thereof, and the results of the compressive strength are summarized in Table 4.

TABLE 4

| Components | Foam Composition Not of This Invention | Foam Compsition of this Invention | Foam Compsition of this Invention | Foam Compsition of this Invention | Foam Compsition of this Invention |
|---|---|---|---|---|---|
| Polyol (Dow Vor 370) | 30 wt % | 30 wt % | 30 wt % | 30 wt % | 30 wt % |
| Polyol (Oxid TR-681) | 30 wt % | 30 wt % | 30 wt % | 30 wt % | 30 wt % |
| RB-79 Flame Retardant (Component A) | 18 wt % | 10.8 wt % | 12.6 wt % | 14.4 wt % | 16.2 wt % |
| D.E.R. 736 (Component B) | none | 16 wt % | 12 wt % | 8 wt % | 4 wt % |
| Trichloroisopropylphosphate | 22 wt % | 13.2 wt % | 15.4 wt % | 17.6 wt % | 19.8 wt % |

TABLE 4-continued

| Components | Foam Composition Not of This Invention | Foam Compsition of this Invention | Foam Compsition of this Invention | Foam Compsition of this Invention | Foam Compsition of this Invention |
|---|---|---|---|---|---|
| (Component C) Catalyst (PCat Mix) | 7 wt % | 7 wt % | 7 wt % | 7 wt % | 7 wt % |
| Cyclopentane | 23.5 wt % | 23.5 wt % | 23.5 wt % | 23.5 wt % | 23.5 wt % |
| Compression, psi | | | | | |
| 3.5 minutes | 12.7 | 13.6 | 13.4 | 13.6 | 11.6 |
| 4 minutes | 11.8 | 13.6 | 11.9 | 11.6 | 11.3 |
| 5 minutes | 12.8 | 16.2 | 11.7 | 12.4 | 11.3 |
| 6 minutes | 16.4 | 16.5 | 15.9 | 16.6 | 15.9 |
| 7 minutes | 16.8 | 15.4 | 16.2 | 17.0 | 17.0 |
| Peak, Time | 7 | 6 | 7 | 7 | 7 |
| Load | 16.8 | 16.5 | 16.2 | 17 | 17 |
| Aged PSI | 17.2 | 14.8 | 11.9 | 13.8 | 13.5 |
| Cell Wall | 758 | 764 | — | — | 812 |
| Cells/Inch | 152 | 152 | — | — | 130 |

EXAMPLE 7

An additive composition of this invention is formed from the following components in the proportions specified:
A) A mixed ester of tetrabromophthalic anhydride with diethylene glycol and propylene glycol (SAYTEX RB-79 flame retardant; Albemarle Corporation)-39.5 wt %
B) A liquid polyglycol diepoxide (D.E.R. 736P; The Dow Chemical Company)-10.0 wt %
C) Tris(2-chloroisopropyl)phosphate (Antiblaze® TMCP flame retardant; Albemarle Corporation)-41.5 wt %
D) Diethylethanephosphonate (Antiblaze V490 flame retardant; Albemarle Corporation)-9 wt %.

This flame retardant additive composition has a viscosity of about 160 cP at 25° C.

EXAMPLE 8

An additive composition of this invention is formed from the following components in the proportions specified:
A) A mixed ester of tetrabromophthalic anhydride with diethylene glycol and propylene glycol (SAYTEX RB-79 flame retardant; Albemarle Corporation)-74.5 wt %
B) A liquid polyglycol diepoxide (D.E.R. 736P; The Dow Chemical Company)-6.0 wt %
C) Tris(2-chloroisopropyl)phosphate (Antiblaze® TMCP flame retardant; Albemarle Corporation)-16.5 wt %
D) Diethylethanephosphonate (Antiblaze V490 flame retardant; Albemarle Corporation)-6 wt %.

This flame retardant additive composition has a viscosity of about 2640 cP at 25° C.

The flame retardant additive compositions of this invention can be used in any of a variety of polyurethanes (including modified polyurethane polymers), and in foams thereof, especially rigid foams thereof. Non-limiting examples of polymers and rigid foams in which the flame retardant additive compositions of this invention can be used include polymers and foams described in U.S. Pat. Nos. 3,954,684; 4,209,609; 5,350,780; 5,356,943; 5,367,000; 5,563,180; 6,121,338; 6,140,383 and references cited therein dealing with such subject matter. All such patents and references are incorporated herein by reference as if fully set forth herein.

Compounds referred to by chemical name or formula anywhere in this document, whether referred to in the singular or plural, are identified as they exist prior to coming into contact with another substance referred to by chemical name or chemical type (e.g., another component, or a solvent. It matters not what preliminary chemical changes, if any, take place in the resulting mixture or solution, as such changes are the natural result of bringing the specified substances together under the conditions called for pursuant to this disclosure. Also, even though the claims may refer to substances in the present tense (e.g., "comprises" or "is"), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

All documents referred to herein are incorporated herein by reference in toto as if fully set forth in this document.

This invention is susceptible to considerable variation within the spirit and scope of the appended claims.

The invention claimed is:

1. A free-flowing, non-viscous liquid flame retardant additive composition for blending with other ingredients to obtain a composition useful for producing flame retarded rigid polyurethanes, said additive composition consisting essentially of or formed by mixing together components consisting essentially of:
A) at least one organic halogen-containing reactive flame retardant in which the halogen is bromine, chlorine or both; and
B) at least one liquid aliphatic polyepoxide of the formula:

$R(Ep)_n$;

wherein R is a straight chain or branched chain aliphatic moiety which consists of carbon, hydrogen, and optionally, one or more ether oxygen atoms and/or one or more epoxy oxygen atoms; Ep is a terminal epoxy group: and n is a whole or fractional number in the range 2 to about 6; and optionally
C) at least one organic phosphorus-containing flame retardant selected from the group consisting of C1) at least one organic phosphate ester and C2) at least one organic phosphonate ester:

said additive composition having:
(i) when C) is not present, an A):B) weight ratio in the range of about 97.7:2.3 to about 67:33;
(ii) when C) is present other than a combination of C1) and C2), an A):B):C) weight ratio in the range of about 85:2:13 to about 30:15:55; and
(iii) when C) is present as a combination of C1) and C2), an A):B):C1):C2) weight ratio in the range of about 85:2:12:1 to about 30:15:45:10.

2. An additive composition as in claim 1 wherein the halogen of said at least one organic halogen-containing reactive flame retardant of A) is bromine only.

3. An additive composition as in claim 1 wherein said at least one organic halogen-containing reactive flame retardant is a mixed ester with a nominal structure of tetrabromophthalic anhydride with diethylene glycol and propylene glycol.

4. An additive composition as in claim 1 wherein said at least one organic halogen-containing reactive flame retardant is at least one bromine-containing polyol reactive flame retardant formed from the reaction of (a) tetrabromophthalic anhydride with (b) an aliphatic polyol to form an acid-ester, followed by reaction of said acid-ester with (c) ethylene oxide or propylene oxide, or both.

5. An additive composition as in claim 1 wherein said additive composition has a Brookfield viscosity at 25° C. of 10,000 cps or less.

6. An additive composition as in claim 1 wherein said additive composition has a Brookfield viscosity at 25° C. of 5000 cps or less.

7. An additive composition as in claim 1 wherein said additive composition has a Brookfield viscosity at 25° C. of about 1000 cps or less.

8. An additive composition as in any of claims 1-7 wherein n is 2.

9. An additive composition as in any of claims 1-7 wherein said additive composition consists essentially of or is formed by mixing together components consisting essentially of said A), said B), and said C).

10. A flame retarded polymer composition in which the polymer is (i) a rigid polyurethane polymer, (ii) a rigid polyisocyanurate polymer, (iii) a rigid polyurethane polymer foam, or (iv) a rigid polyisocyanurate polymer foam, in which the flame retardant composition utilized in forming said flame retarded polymer is a composition as in any of claims 1-4.

11. A flame retarded polymer composition as in claim 10 in which the flame retardant composition utilized in forming said flame retarded polymer composition is an additive composition which consists essentially of or is formed by mixing together components consisting essentially of:
A) at least one organic halogen-containing reactive flame retardant in which the halogen is bromine, chlorine or both; and
B) at least one liquid aliphatic polyepoxide of the formula:

R(Ep)$_n$;

wherein R is a straight chain or branched chain aliphatic moiety which consists of carbon, hydrogen, and optionally, one or more ether oxygen atoms and/or one or more epoxy oxygen atoms; Ep is a terminal epoxy group: and n is a whole or fractional number in the range 2 to about 6; and optionally
C) at least one organic phosphorus-containing flame retardant selected from the group consisting of C1) at least one organic phosphate ester and C2) at least one organic phosphonate ester:

said additive composition having:
(i) when C) is not present, an A):B) weight ratio in the range of about 97.7:2.3 to about 67:33;
(ii) when C) is present other than a combination of C1) and C2), an A):B):C) weight ratio in the range of about 85:2:13 to about 30:15:55; and
(iii) when C) is present as a combination of C1) and C2), an A):B):C1):C2) weight ratio in the range of about 85:2:12:1 to about 30:15:45:10.

12. A precursor composition for preparing a rigid polyurethane polymer, a rigid polyisocyanurate polymer, a rigid polyurethane polymer foam, or a rigid polyisocyanurate polymer foam with which precursor composition has been blended individually, as one or more subcombinations, or as a preformed additive composition, components consisting essentially of or formed by mixing together components consisting essentially of A) and B) and optionally C), of claim 1 in the following proportions:
(i) when C) is not present, an A):B) weight ratio in the range of about 97.7:2.3 to about 67:33;
(ii) when C) is present other than a combination of C1) and C2), an A):B):C) weight ratio in the range of about 85:2:13 to about 30:15:55; and
(iii) when C) is present as a combination of C1) and C2), an A):B):C1):C2) weight ratio in the range of about 85:2:12:1 to about 30:15:45:10.

13. A rigid polyurethane polymer, a rigid polyisocyanurate polymer, a rigid polyurethane polymer foam, or a rigid polyisocyanurate polymer foam formed by polymerizing a precursor composition as in claim 12.

14. A method for preparing a polyurethane or polyisocyanate, which method comprises combining a flame retardant additive composition of claim 1, at least one polyol having hydroxyl values in the range of about 150 to about 850 mg KOH/g, and an organic polyisocyanate.

15. A method for preparing a polyurethane or polyisocyanate, which method comprises combining a precursor composition of claim 12, at least one polyol having hydroxyl values in the range of about 150 to about 850 mg KOH/g, and an organic polyisocyanate.

* * * * *

UNITED STATES PATENT AND TRADEMARK OFFICE
CERTIFICATE OF CORRECTION

| | | |
|---|---|---|
| PATENT NO. | : 7,862,749 B2 | Page 1 of 1 |
| APPLICATION NO. | : 11/569210 | |
| DATED | : January 4, 2011 | |
| INVENTOR(S) | : Rinus Sjerps | |

It is certified that error appears in the above-identified patent and that said Letters Patent is hereby corrected as shown below:

ON THE TITLE PAGE:

Item (56) References Cited, under FOREIGN PATENT DOCUMENTS, reads "CA 781048  6/1967" and should read -- CA 761048  6/1967 --.

Signed and Sealed this
Fifteenth Day of May, 2012

David J. Kappos
*Director of the United States Patent and Trademark Office*